(No Model.)
J. CHALLONER, Sr.
MACHINE BRAKE.
No. 316,744. Patented Apr. 28, 1885.
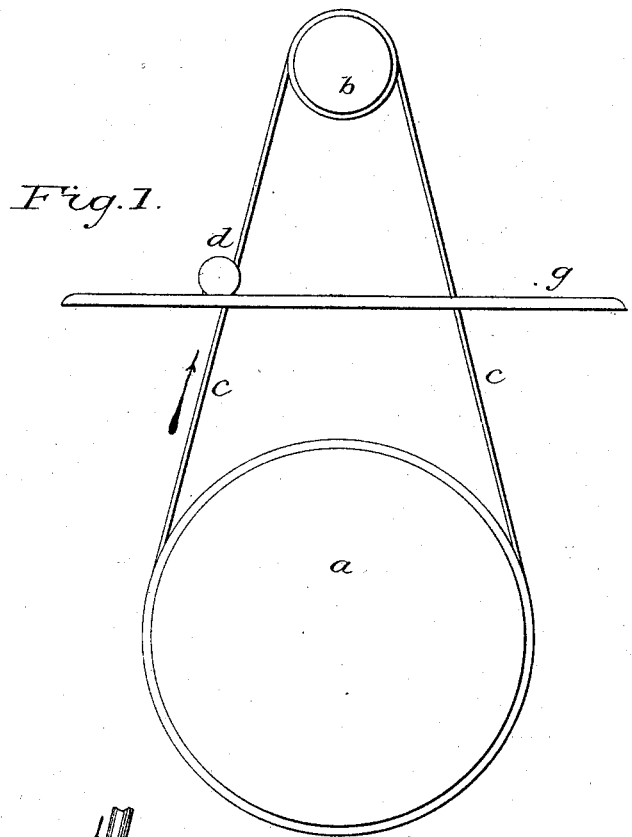
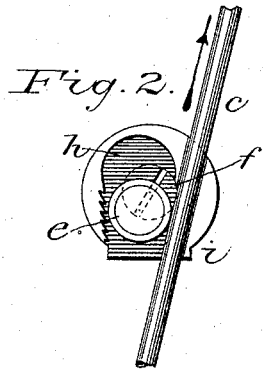
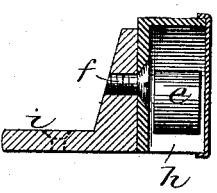
Witnesses:
John T. Morrow.
Philip C. Masi.
Inventor:
John Challoner Sr
By Anderson & Smith
his Attorneys.

UNITED STATES PATENT OFFICE.

JOHN CHALLONER, SR., OF OMRO, WISCONSIN.

MACHINE-BRAKE.

SPECIFICATION forming part of Letters Patent No. 316,744, dated April 28, 1885.

Application filed January 5, 1885. (No model.)

*To all whom it may concern:*

Be it known that I, JOHN CHALLONER, Sr., a citizen of the United States, residing at Omro, in the county of Winnebago and State of Wisconsin, have invented a new and useful Improvement in Sewing-Machines, of which the following is a specification.

This invention has relation to improvements in machine-brakes, and is more particularly adapted for use upon sewing-machines.

The invention consists in the construction, novel arrangement, and adaptation of devices, as will be hereinafter more fully set forth, and particularly pointed out in the claims appended.

The invention is fully illustrated in the accompanying drawings, in which Figure 1 is an edge view of a sewing-machine table, showing my invention applied to the drive-belt. Fig. 2 is an interior view of the brake, showing a portion of a drive-belt, and Fig. 3 is a sectional view with the belt removed.

In the said drawings, $a$ indicates a drive-wheel, $b$ the driven wheel, and $g$ the table, of any ordinary sewing-machine.

A indicates a bracket composed of a vertical portion, D, and a horizontal portion, $i$, the former having a vertical perforation for the passage of a screw to attach the device to the table $g$, and the latter a horizontal transverse internally-threaded aperture for the reception of a screw for securing the ball-casing thereto.

D indicates the ball casing or receptacle, which may be of annular contour having the recess or ball receptacle $h$, through which passes diagonally the belt or band way E, and the inner vertical wall is provided with a transverse aperture for the passage of a securing-screw to the attaching-bracket A.

The inner side of the wall F, opposite the band or belt way, is provided with teeth or serrations, the directions of which are inward and downward. By this arrangement of the teeth it will be seen that when the machine is running the wall $e$ in the casing will be turned in the direction in which the teeth point; but when the belt takes a backward course the teeth will bite upon the elastic surface of the ball and instantaneously stop the motion of the machine. The ball or roller $e$ is formed of iron, and is provided with a rubber or elastic covering, as shown.

As the angle of the drive belt or band varies according to the diameter of the drive-wheel and band-wheel employed, it is necessary that the angle of the bandway in the casing should be changed accordingly, and to obviate this difficulty my invention is peculiarly adapted. It will be seen that when it is desirable to change the angle or inclination of the bandway to correspond with that of any drive band or belt it is only necessary to remove the cover G of the ball-casing and take out the ball, after which the screw $f$ may be loosened until the casing is turned to the proper position, when the screw can be tightened and the ball and cover replaced.

Having described this invention, what I claim, and desire to secure by Letters Patent, is—

1. A sewing-machine brake the ball casing or receptacle of which is provided with a bandway, and adapted to be adjusted for the inclinations of various bands or belts of sewing-machines, substantially as specified.

2. The combination, with the bracket having the vertical arm provided with a transverse internally-threaded aperture, of the ball casing or receptacle and a screw for connecting the same, substantially as specified.

3. The brake-ball composed of metal and a covering of rubber or other elastic material, substantially as specified.

4. The ball casing or receptacle having a bandway, and the inner wall opposite the said way provided with serrations, substantially as specified.

5. The brake described, consisting of the bracket having the vertical and horizontal arms, the casing having the removable cover, the inner serrated wall, and the screw aperture, and the metal ball covered with rubber, substantially as specified.

JOHN CHALLONER, SR.

Witnesses:
EDWARD MARSHALL,
JOHN W. CHALLONER.